US 6,655,744 B2

(12) United States Patent
Petri et al.

(10) Patent No.: US 6,655,744 B2
(45) Date of Patent: Dec. 2, 2003

(54) SEAT BELT SYSTEM

(75) Inventors: Patrick A. Petri, Vaud (CH); Ernesto E. Blanco, Belmont, MA (US); Greg Fraley, Farmington Hills, MI (US); Nicole Poponea, Bloomfield Hills, MI (US); H. Winston Maue, Northville, MI (US)

(73) Assignee: Lear Corporation, Southfield, MI (US)

( * ) Notice: Subject to any disclaimer, the term of this patent is extended or adjusted under 35 U.S.C. 154(b) by 62 days.

(21) Appl. No.: 10/015,263

(22) Filed: Dec. 12, 2001

(65) Prior Publication Data
US 2002/0109392 A1 Aug. 15, 2002

Related U.S. Application Data
(60) Provisional application No. 60/255,526, filed on Dec. 13, 2000.

(51) Int. Cl.⁷ .............................................. B60R 21/00
(52) U.S. Cl. ........................................ 297/478; 297/484
(58) Field of Search ................................ 297/484, 478, 297/475, 480, 468

(56) References Cited

U.S. PATENT DOCUMENTS

| 1,688,272 A | | 10/1928 | Fouletier |
| 2,899,146 A | * | 8/1959 | Barecki |
| 3,039,802 A | | 6/1962 | Barry |
| 3,100,669 A | * | 8/1963 | Monroe |
| 3,178,225 A | * | 4/1965 | Bayer |
| 3,199,804 A | * | 8/1965 | Fontaine |
| 3,425,646 A | * | 2/1969 | Hollowell |
| 3,620,569 A | * | 11/1971 | Mathis |
| 3,789,492 A | | 2/1974 | Klink |
| 3,853,416 A | | 12/1974 | Hanan |
| 3,905,615 A | | 9/1975 | Schulman |
| 4,000,548 A | | 1/1977 | Stephenson et al. |
| 4,208,771 A | | 6/1980 | Biller |
| 4,302,049 A | | 11/1981 | Simpson |
| 4,312,539 A | * | 1/1982 | Takada |
| 4,313,246 A | | 2/1982 | Fohl |
| 4,396,228 A | | 8/1983 | Go |
| 5,050,926 A | | 9/1991 | Tanaka |
| 5,096,236 A | | 3/1992 | Thony |
| 5,123,673 A | * | 6/1992 | Tame |
| RE34,051 E | * | 9/1992 | Deegener et al. |
| 5,301,903 A | | 4/1994 | Aronne |
| 5,306,044 A | | 4/1994 | Tucker |
| 5,676,398 A | | 10/1997 | Nurtsch |
| 6,309,024 B1 | * | 10/2001 | Busch |

* cited by examiner

Primary Examiner—Milton Nelson, Jr.
(74) Attorney, Agent, or Firm—Bill C. Panagos

(57) ABSTRACT

A seat belt system for a vehicle seat having seat belt segments that are retained on first and second retractors. The retractors each have a spool on which seat belt segments are wound. The spools of the first and second retractors are linked together by a spring that biases the spools to retract the belt segments. Right and left seat belt presenters are provided to move the latches of seat belt segments between a retracted position and a presentation position where the latches are held at a convenient location to be grasped by a person seated in the vehicle seat.

16 Claims, 3 Drawing Sheets

SEAT BELT SYSTEM

CROSS-REFERENCE TO RELATED APPLICATIONS

This application claims the benefit of U.S. provisional application Ser. No. 60/255,526 filed Dec. 13, 2000 which is incorporated herein in its entirety.

TECHNICAL FIELD

The present invention relates to vehicle seat belt systems and components.

BACKGROUND ART

Current vehicle seat belt designs are generally of the three point type wherein three anchoring points are provided for two lengths of belt. The two lengths of belt are referred to as the lap belt and shoulder belt. The two lengths of belt are both connected to a single latch mechanism located adjacent a seat occupant's hip. The seat belt latch includes one portion that is connected to the lap and shoulder belt. The other end of the latch is non-extensibly mounted to the seat structure or a seat belt latch presenter that holds the latch at a fixed location.

Four point and five point seat belts have been used in race cars and by airplane pilots but have not been accepted for normal passenger car and truck applications because prior designs were difficult to use. With four or five point belt systems, the preferred location of the latch is a mid-body position that allows for a symmetrical belt arrangement and convenient single latch mechanism. It would also be helpful to provide a four point seat belt latch mechanism that may be operated by one hand and that would minimize difficulties relating to aligning the two latch parts to secure the latch parts together.

Another problem unresolved by prior art four point belt systems is providing for a simple and effective belt presentation system that makes it convenient for vehicle seat occupants to locate and operate the seat belt latch.

These and other problems and disadvantages associated with prior art seat belt systems is addressed by applicant's invention as summarized below.

DISCLOSURE OF INVENTION

According to one aspect of the invention, a self-centering, equalized seat belt retractor is provided. Two seat belt retractors are provided for two independently movable belt segments, preferably two lap belt segments, that are linked together by means of a torsion spring. Each of the retractors includes a separate spool on which a belt segment is wound to retract the belt and unwound to allow the belt to be extended from the retractor. One retractor rotates in a clockwise direction to retract the belt while the other retractor rotates in a counterclockwise direction to retract its associated belt segment. The spring is provided to equalize the retractive force exerted by the seat belt retractors on the two belt segments which also causes the latch mechanism to be centered relative to a seat occupant's body. The two linked belt retractors are preferably mounted on the floor or on the lower seat structure of the vehicle seat. The seat belt retractors include an inertial locking pawl or brake that locks the retractors in the event of an impact.

According to another aspect of the invention, belt presenters are provided on a vehicle seat for presenting two parts of a seat belt latch when a person initially sits down in the vehicle seat. Weight sensors provided in the vehicle seat activate the seat belt presenters. The seat belt presenters comprise arms on opposite sides of a vehicle seat that are pivotally connected to opposite sides of the vehicle seat. The arms pivot from a first position wherein the seat belt latch is grasped by a magnet, hook, or other grasping device. When a person initially sits on the vehicle seat, the seat belt presenters are in their first position. Upon sensing the presence of a person's body in the seat, the seat belt presenters rotate to the position where the seat belt latches held by the seat belt presenter are moved to an easily accessible position forward of the person's torso and above the person's lap. The seat belt latches may then be conveniently gripped by the seat occupant and released from the belt presenters. When the seat belt latches are engaged with each other, a seat belt latch sensor provides a signal to the belt presenter to return the belt presenters to their first position. When a person is ready to leave the vehicle seat, they merely unbuckle the seat belt latch allowing the retractors to return the two parts of the seat belt latch to their retracted position adjacent to the end of the seat belt presenter. The seat belt presenter then grasps or engages the seat belt latches so that the belt presenters are ready to repeat the cycle.

The above aspects of the various inventions disclosed will be better understood in view of the attached drawings and following detailed description of various modes of the invention.

BEST MODE FOR CARRYING OUT THE INVENTION

Figure 1:
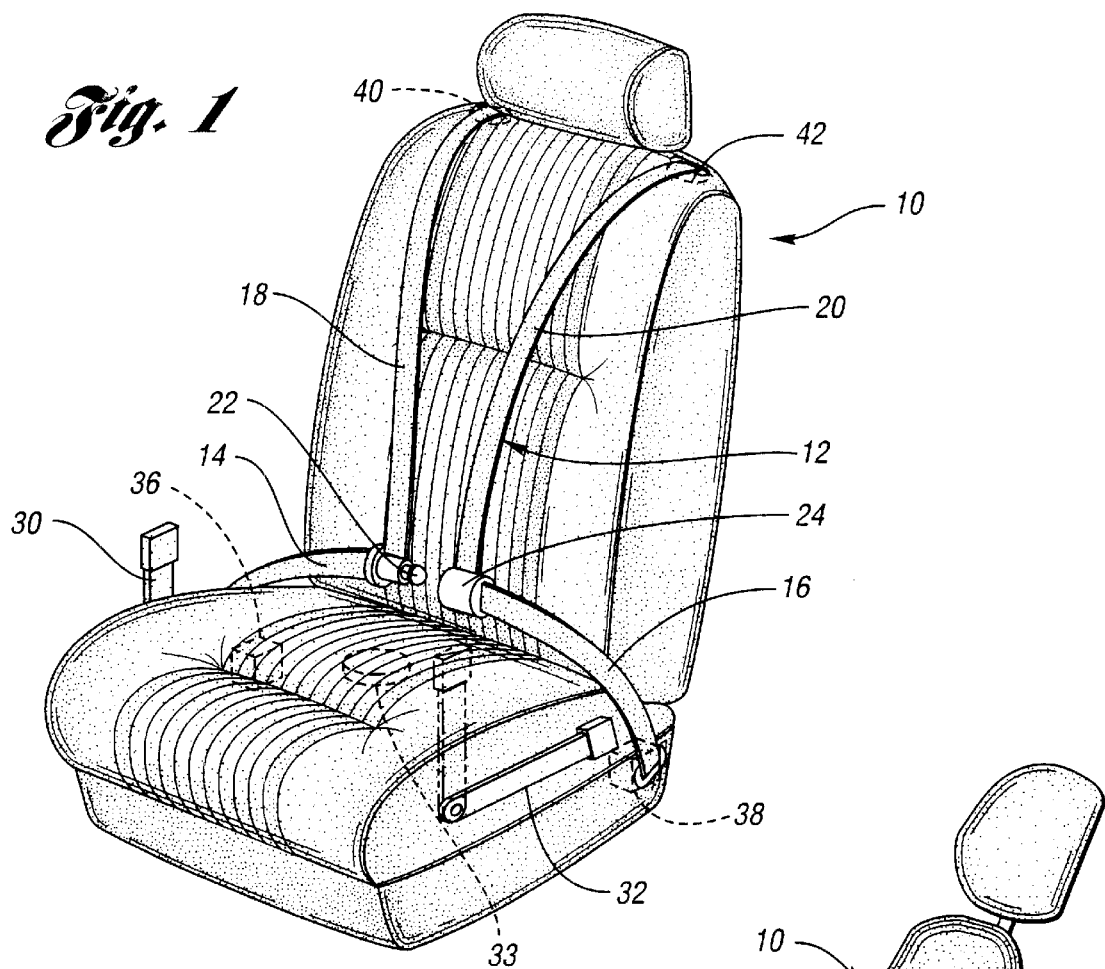
FIG. 1 is a perspective view of a seat having a four point seat belt system made according to the present invention.

Referring now to FIG. 1, a vehicle seat 10 having a four point seat belt 12 made in accordance with the present invention is shown. The four point seat belt 12 includes a right lap belt 14, left lap belt 16, right shoulder belt 18, and a left shoulder belt 20. The right lap belt 14 and right shoulder belt 18 are connected to a plug latch 22. The left lap belt 16 and left shoulder belt 20 are connected to a receptacle latch 24. The plug latch 22 and receptacle latch 24 are secured together to link the four point seat belt 12.

Figure 2:
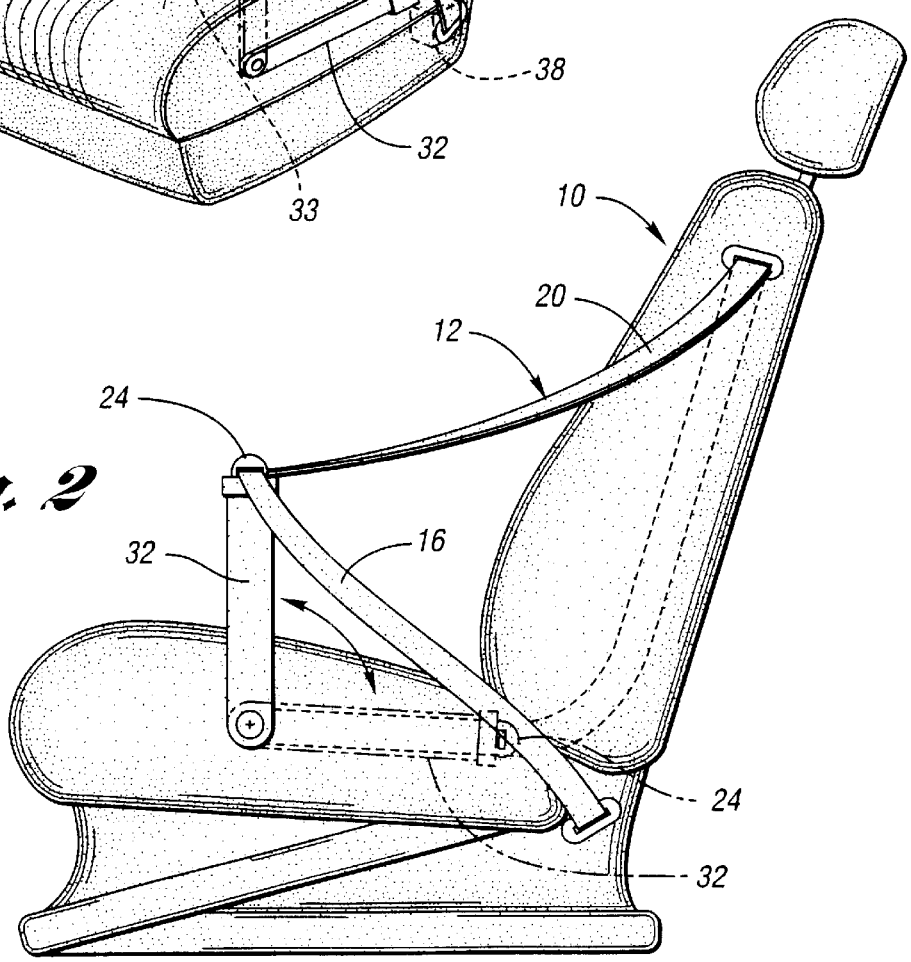
FIG. 2 is a side elevation view of a seat having a four point seat belt system and seat belt presenter made according to the present invention.

Referring to FIGS. 1 and 2, right and left seat belt presenters 30 and 32, respectively, are provided to position the plug latch 22 and receptacle latch 24 at a convenient position for the occupant of the seat to grab the latches 22, 24 for engagement. The right and left seat belt presenters 30, 32 are normally retained in a generally horizontal orientation as shown in FIG. 1 adjacent the base of the vehicle seat 10. When a person initially sits down in the vehicle seat 10, weight sensors 33 that are known in the art for other purposes, such as seat belt use indicators or air bag sensors, provide a signal to a motor drive that pivots the seat belt presenters 30, 32 to a generally vertical orientation as shown on the right side of FIG. 1 or as shown in FIG. 2.

Figure 7:
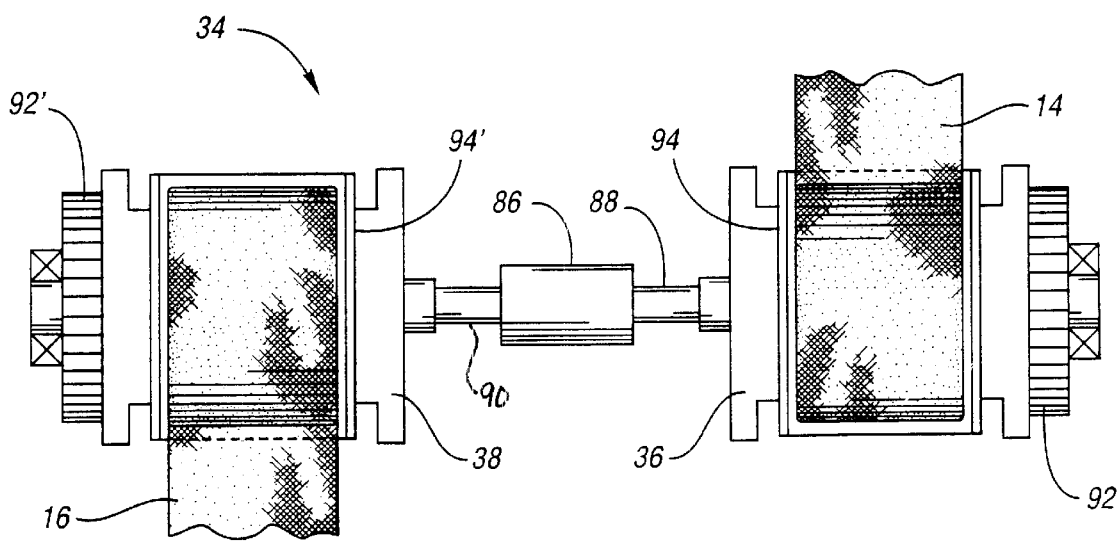
FIG. 7 is a schematic plan view of a linked retractor made according to the present invention.

Referring now to FIG. 7, a linked lap belt retractor 34 is shown. The linked lap belt retractor 34 is secured to the base of the vehicle seat 10, shown in FIG. 1. The linked lap belt retractor 34 includes a right side 36 and a left side 38 that are linked as shown in FIG. 7. Right and left shoulder belt retainers 40 and 42 are provided in the upper portion of the vehicle seat 10 to retain the right and left shoulder belts 18, 20. The linked lap belt retractor 34 is intended to provide a simple and convenient mechanism for centering the latches 22, 24 relative to a seat occupant's body. Operation of the linked lap belt retractor 34 will be more specifically described below with reference to FIG. 7.

Figure 3:
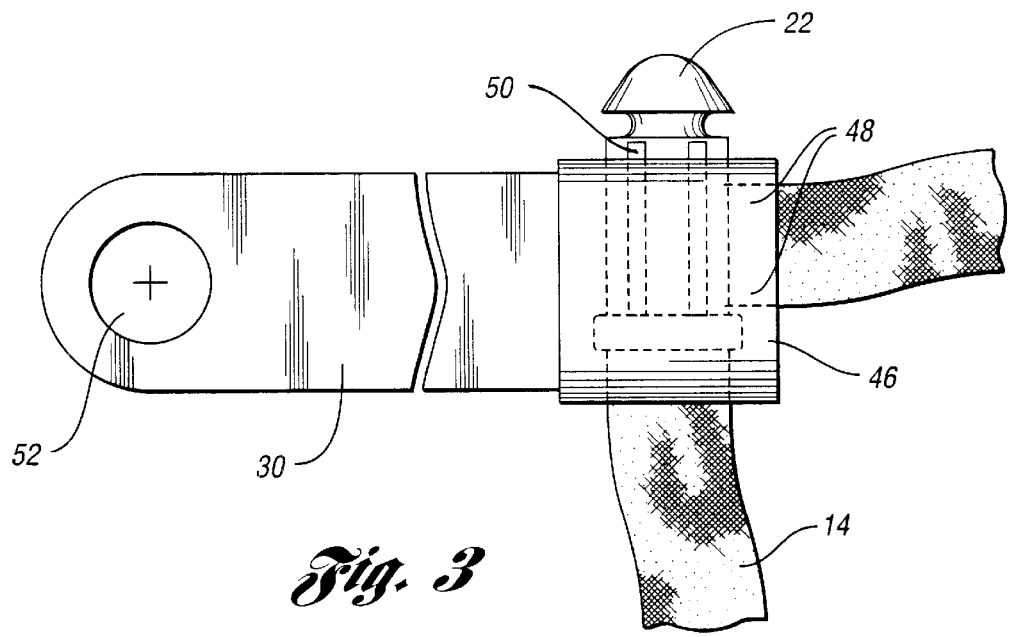
FIG. 3 is a fragmentary side elevation view of a seat belt presenter and one part of a seat belt latch made according to the present invention.

Referring now to FIG. 3, the right seat belt presenter 30 is illustrated in greater detail. The right seat belt presenter 30 presents the plug latch 22 to the seat occupant. The plug latch 22 as previously described is connected to the right lap belt 14 and the right shoulder belt 18. A gripper 46 is provided on the right seat belt presenter 30 that is effective to grip the plug latch 22 sufficiently to allow it to be lifted by the arcuate motion of the right seat belt presenter 30 through an arc of about 90–120°. One form of the gripper 46 may be a magnetic gripper wherein magnetic strips 48 are provided on the gripper 46 that are attracted to the body of the plug latch 22 if it is formed of a ferrous material. Magnetic strips 50 may be provided on the plug latch 22. Magnetic strips would also be provided on the left seat belt presenter 32 and the receptacle latch 24. Alternatively, a hook, clamp, or other engaging apparatus could be used as the gripper 46. A pivot connector 52 is provided at the opposite end of the right seat belt presenter 30. Pivot connector 52 is preferably connected to an arcuately movable motor shaft and/or springs that would be effective to rotate the seat belt presenters 30, 32 between a generally vertical presentation position and a generally horizontal retracted position. As will be readily understood by one of ordinary skill in the art, an electromagnet or bar magnet could be used in place of magnet strips 48, 50.

Figure 4:
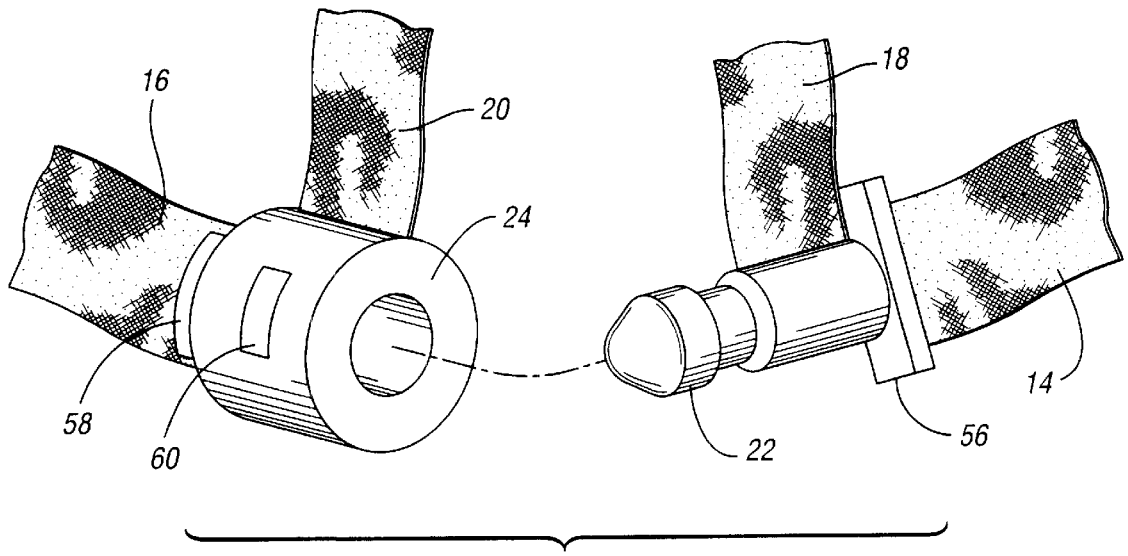
FIG. 4 is a fragmentary perspective view of a seat belt latch made according to one embodiment of the present invention.
Figure 5:
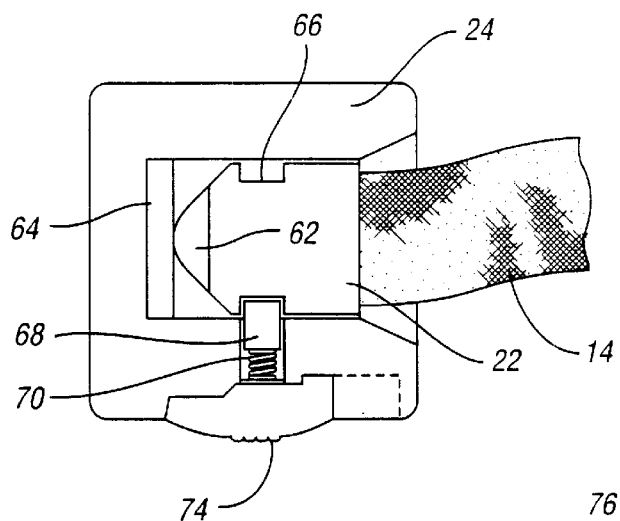
FIG. 5 is a cross-sectional view of a seat belt latch made according to another embodiment of the present invention.
Figure 6:
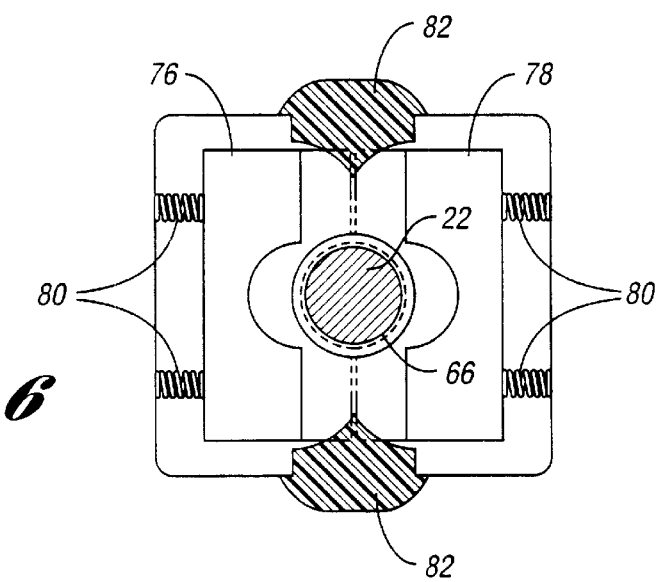
FIG. 6 is a partially cross-section, partially schematic view of another embodiment of the seat belt latch made according to the present invention.

Referring now to FIGS. 4–6, the plug and receptacle latches 22, 24 are shown and described. The plug latch 22 is connected to the right lap belt 14 and right shoulder belt 18. The receptacle latch 24 is connected to the left lap belt 16 and left shoulder belt 20. A magnet 56 may be provided on the plug latch 22 while a magnet 58 may be provided on the receptacle latch 24. The magnets may be either used for engagement with the seat belt presenters 30, 32 or could also be used to provide guidance and assistance in interlocking the plug latch 22 and receptacle latch 24 together. A release button 60 is provided on the receptacle latch 24. The release button 60 may take many forms.

Referring now to FIG. 5, one example of the plug and receptacle latches 22, 24 is shown that includes a magnet 62 on the tip of the plug latch 22 that is attracted by magnet 64 on the receptacle latch 24. When the plug and receptacle latches 22, 24 are connected, an annular groove 66 in the plug latch 22 receives a pin 68 that is biased by a spring 70 toward the annular groove 66. Release button 74 is schematically shown as one potential release mechanism. When the release button 74 is slid to the position shown in phantom lines in FIG. 5, the pin 68 is permitted to retract from the annular groove 66.

Referring now to FIG. 6, an alternative latch mechanism is illustrated and described. First and second latch plates 76 and 78 are mounted in opposing relationship in the receptacle latch 24. The plug latch 22 is shown between the first and second latch plates 76, 78. Springs 80 are provided on the outer ends of the first and second latch plates 76, 78 to urge the latch plates 76, 78 into engagement with the plug latch 22. When in the closed position as shown in phantom lines in FIG. 7, the latch plates 76, 78 are received in the annular groove 66 of the plug latch 22. Release buttons 82 are provided above and below the point at which the latch plates 76, 78 come together to grip plug latch 22. Release buttons 82 are shown schematically to illustrate how a wedge-type separating mechanism could be used in conjunction with the latch plates 76, 78. The release buttons 82 could take other forms including a camming arrangement or spring latch.

Referring now to FIG. 7, the linked lap belt retractor 34 is shown schematically to include right and left sides 36, 38 that retract right lap belt 14 and left lap belt 16, respectively. A torsion spring or helical spring 86 is connected to first and second extension shafts 88 and 90 that extend from the right and left sides 36, 38 of the linked lap belt retractor 34. The spring exerts an equalized spring biasing force on the shafts 88 and 90 that act on the right and left sides 36, 38 of the retractor 34. The coupling spring 86 would have a spring constant that can be optimized according to human factors.

Inertial brakes 92, 92' are provided on the right and left sides 36, 38 of the linked lap belt retractor 34 that are designed to lock the spools 94, 94' upon impact as is well known in the art. The inertial brakes 92, 92' could also be an inertial locking latch pawl that is capable of performing the same function.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A seat belt retractor system for a vehicle having a seat with a backrest portion and a seat belt, in combination, comprising first and second lap belt segments that are detachably secured together by a latch:

a right lap belt retractor having a first spool for the take-up of the first lap belt segment;

a left lap belt retractor having a second spool for the take-up of the second lap belt segment;

a spring linking the right and left lap belt retractors together and biasing the first and second spools to retract the first and second lap belt segments onto the first and second spools, respectively; and further comprising a right shoulder belt segment extending from the latch to a back rest portion of the seat and a left shoulder belt segment extending from the latch to the back rest portion.

2. The combination of claim 1 wherein the first lap belt segment and first shoulder belt segment are portions of a single length of belt that are divided by the location of the latch.

3. A seat belt retractor system for a vehicle having a seat and a seat belt comprising first and second lap belt segments that are detachably secured together by a latch:

a right lap belt retractor having a first spool for the take-up of the first lap belt segment;

a left lap belt retractor having a second spool for the take-up of the second lap belt segment; and a spring linking the right and left lap belt retractors together and biasing the first and second spools to retract the first and second lap belt segments onto the first and second spools, respectively.

4. The seat belt retractor system of claim 3 wherein the latch includes a plug portion and a receptacle portion each of which are secured to one of the first and second lap belt segments, respectively.

5. The seat belt retractor system of claim 3 wherein the right and left lap belt retractors further comprise an inertial lock mechanism that locks the first and second lap belt segments when an inertial load is applied to the vehicle that is greater than a predetermined level.

6. The seat belt retractor system of claim 3 in combination with the vehicle seat wherein the first and second spools are fixedly mounted below a lower seat portion of the vehicle seat.

7. A seat belt system and vehicle seat, in combination, the seat having a base portion and a back portion, and a seat belt having first and second lap belt segments and first and second shoulder belt segments, wherein the first lap and shoulder belt segments are joined together and the second lap and shoulder segments are joined together, the system further comprising:

a right side belt presenter moveably secured adjacent a right side of the vehicle seat and engaging the first lap segment and first shoulder segment in a retracted position near the location where the base portion and back portion meet;

a left side seat belt presenter moveably secured adjacent a left side of the vehicle seat and engaging the second lap segment and second shoulder segment in a retracted position near the location where the base portion and back portion meet; and the right side and left side seat belt presenters being movable to a presentation position above the base portion and forward of the back portion wherein the first lap and shoulder segments and second lap and shoulder segments are held at a convenient location to be grasped by a person seated in the vehicle seat.

8. The combination of claim 7 wherein the right and left seat belt presenters are pivotally connected to the seat base portion by a pivot connection and the pivot connection is disposed forward of the back portion of the seat.

9. The combination of claim 7 further comprising at least one motor operatively connected to the right and left seat belt presenters for selectively moving the presenters between the retracted position and the presentation position.

10. The combination of claim 7 further comprising pressure sensors secured to the seat that detect when a person sits down on the seat and responds by actuating the right and left seat belt presenters to move the seat belt presenters to the presentation position.

11. The combination of claim 7 wherein the right and left seat belt presenters are disposed in a generally horizontal orientation when in the retracted position and they are disposed in a generally vertical orientation when in the presentation position.

12. The combination of claim 7 wherein the right and left seat belt presenters are detachably secured to a right latch and a left latch, respectively, when the presenters are in the retracted position by a magnetic coupler.

13. The combination of claim 7 wherein a first latch and a second latch are adapted to be detachably secured together in front of a person seated in the vehicle seat to secure the person when in the seat and wherein the first and second lap belt segments are retracted to the retracted position when the first and second latches are released.

14. The combination of claim 13 wherein when the first and second latches are detachably secured to the right and left presenters, respectively, when the latches are in the retracted position.

15. The seat combination of claim 13 wherein the first latch is a cylindrical member and the second latch has a cylindrical receptacle opening in which the first latch is received.

16. The combination of claim 15 wherein the cylindrical receptacle opening is formed by first and second plates having mating semicircular cut-outs within which the cylindrical member is received.

* * * * *